United States Patent
Kiuchi et al.

(10) Patent No.: US 6,429,951 B1
(45) Date of Patent: Aug. 6, 2002

(54) APPARATUS AND METHOD FOR PRODUCING PRINT DATA OF A TWO-DIMENSIONAL CODE AND RELATED RECORDING MEDIA

(75) Inventors: Jun-ichiro Kiuchi, Tokyo; Hiromitsu Takai, Yokohama; Takahiro Kurobe, Nagoya; Hisashi Shigekusa, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/289,058

(22) Filed: Apr. 12, 1999

(30) Foreign Application Priority Data

Apr. 22, 1998 (JP) .............................. 10-112255

(51) Int. Cl.⁷ .......................... G06K 1/12; G06K 15/02; G06K 19/06; H04N 1/393; G06T 3/40
(52) U.S. Cl. ............................ 358/1.9; 235/494; 358/3; 358/1.2; 382/256; 382/299
(58) Field of Search ......................... 358/1.9, 1.2, 470, 358/451; 235/440, 454, 455, 456, 462.08, 462.09, 462.1, 462.11, 462.25, 462.41, 494; 382/256, 258, 288, 289, 291, 298, 299

(56) References Cited

U.S. PATENT DOCUMENTS 6,267,296 B1 * 7/2001 Ooshima et al. ........ 235/462.08

FOREIGN PATENT DOCUMENTS

| EP | 0953931 | * 11/1999 | ............ G06K/1/12 |
| JP | 10-49610 | 2/1998 | ............... B41J/3/01 |

* cited by examiner

Primary Examiner—Scott Rogers
(74) Attorney, Agent, or Firm—Harness, Dickey & Pierce, PLC (57) ABSTRACT

Regular-size white cells are expanded in advance to adjust a boundary between black cells and the white cells before a printing operation is performed. Shrinkage of black cells occurs in the region where the expanded white cells overhang over the neighboring black cells. No shrinkage of the black cells occurs in the boundary between two black cells which are located next to each other. A region where one white cell overhangs over another white cell remains white. This is simply realized by outputting 0 for the region where the white dot (0) and the black dot (1) are overlapped and by outputting 0 for the region where two white dots (0) are overlapped. By shrinking the black cells beforehand in this manner, the overhang of the black cells over the while cells is reduced or completely eliminated when they grow fat through the data reading performed by facsimile or copying machines.

18 Claims, 10 Drawing Sheets

REGULAR WHITE CELL SIZE
(5 DOTS × 5 DOTS)

Fig. 6A

REGULAR BLACK CELL SIZE
(5 DOTS × 5 DOTS)

Fig. 6B

ENLARGED WHITE CELL SIZE
(6 DOTS × 6 DOTS)

Fig. 6C

ENLARGED WHITE CELL SIZE
(7 DOTS × 7 DOTS)

Fig. 6D

DISPLACEMENT SAMPLE OF REGULAR SIZE CELLS

Fig. 6E

DISPLACEMENT SAMPLE OF ENLARGED WHITE CELLS (6 DOTS × 6 DOTS)

DATA CODE

*Fig. 8A*

CP CODE

*Fig. 8B*

VERI CODE

*Fig. 8C*

CALRA CODE

LINE SCANNING DIRECTION

REGULAR CELL

*Fig. 9C*

SHRUNK CELL

*Fig. 9E*

EXPANDED CELL

APPARATUS AND METHOD FOR PRODUCING PRINT DATA OF A TWO-DIMENSIONAL CODE AND RELATED RECORDING MEDIA

BACKGROUND OF THE INVENTION

The present invention relates to an apparatus and a method for producing print data of a two-dimensional code. The two-dimensional code comprises numerous cells representing binary coded data and arranged as a bright-and-dark pattern on a two-dimensional matrix. Furthermore, the present invention relates to recording media storing program data required for executing the processing for producing the print data in a computer.

Compared with conventional bar codes, many of the two-dimensional codes have the capability of storing a great amount of information. This is advantageous in reducing the overall size of the code. The reading operation of the two-dimensional codes is generally performed based on a dark-and-bright judgement on each cell. Prior to the dark-and-bright judgement, the central position of each cell on a two-dimensional code image is estimated based on computations. Then, the dark-and-bright judgement is performed by judging brightness or darkness of each cell at (or in the vicinity of) the estimative central position. However, the two-dimensional code may not be positioned in parallel with the reading line of a scanner. The two-dimensional code may be printed on a curved or curled surface. In such cases, the scanner possibly reads the two-dimensional image along an inclined direction, with an incorrect estimative central position of each cell deviated from the true position.

If the deviated estimative central position remains in the same cell, it is still possible to correctly judge the brightness and darkness of the cell. Namely, the dark cell will be judged as a dark portion and the bright cell will be judged as a bright portion as far as the estimative central position remains in the same cell.

Figure 9A:
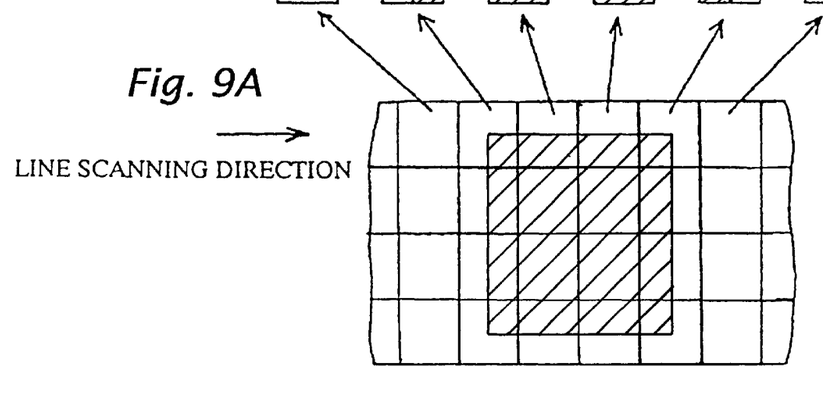
FIGS. 9A to 9E are views illustrating the mechanism of causing expansion or shrinkage of a black cell.

In many cases, facsimile machines and copying machines are involved in the reading operation of the two-dimensional codes. For example, a receiver's facsimile or copying machine prints out a copy of the two-dimensional code which comprises dark cells having grown fat. In the case of the facsimile machine, the resolution limit of its line sensor causes such a growing-fat phenomenon of the dark cells since each sensor element decides the minimum resolution level in the judgment of the darkness and brightness. FIG. 9A shows a scanning operation by a line scanner performed along a periphery of a dark cell. When seen in individual sensor elements, the dark cell occupies part (e.g., a half or a quarter) of the unit area in some of sensor elements. More specifically, when focused on six sensor elements arraying in the line scanning direction shown in FIG. 9A, a first sensor element is a complete bright portion. A second sensor element is a composite element whose three-quarter is a bright portion with the remaining quarter of a dark portion. Next two, i.e., third and fourth, sensor elements are also composite elements each consisting of a bright portion and a dark portion by fifty-fifty. Then, a fifth sensor element is a composite element whose three-quarter is a bright portion with the remaining quarter of a dark portion. And, the last, i.e., a sixth, sensor element is a complete bright portion.

Figure 9B:
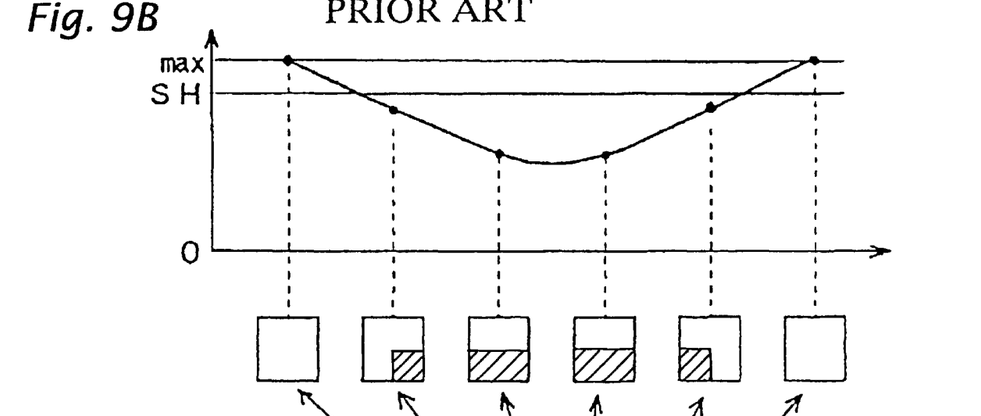
Figure 9C:
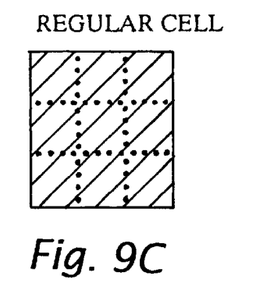
Figure 9D:
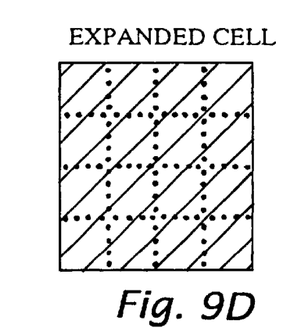
Figure 9E:
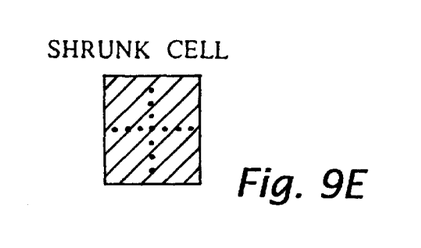

FIG. 9B shows an output signal of the line sensor which is proportional to the area of the bright portion (i.e., proportional to brightness) in each sensor element. A threshold, for detecting the dark portion, is set at a predetermined level which is relatively high. When the sensor signal of a sensor element is lower than the threshold, this sensor element is judged as a dark portion. If the threshold is set at a lower level, certain information may be neglected. For example, a sensor element will be judged as a bright portion when it comprises a smaller dark portion and a larger bright portion. In other words, there is the data not reproducible due to neglect or elimination of the smaller dark portions. Thin lines may disappear. To avoid such disappearing of important information, the threshold is set to a relatively higher level. Accordingly, there is a high probability that a composite sensor element, comprising both dark and bright portions, is judged as a dark portion. As a result, each cell tends to grow fat. For example, a regular-size dark cell of 3 dots×3 dots shown in FIG. 9C expands to the size of 4 dots×4 dots shown in FIG. 9D. For comparison, FIG. 9E shows a shrunken dark cell of 2 dots×2 dots.

Figure 10:
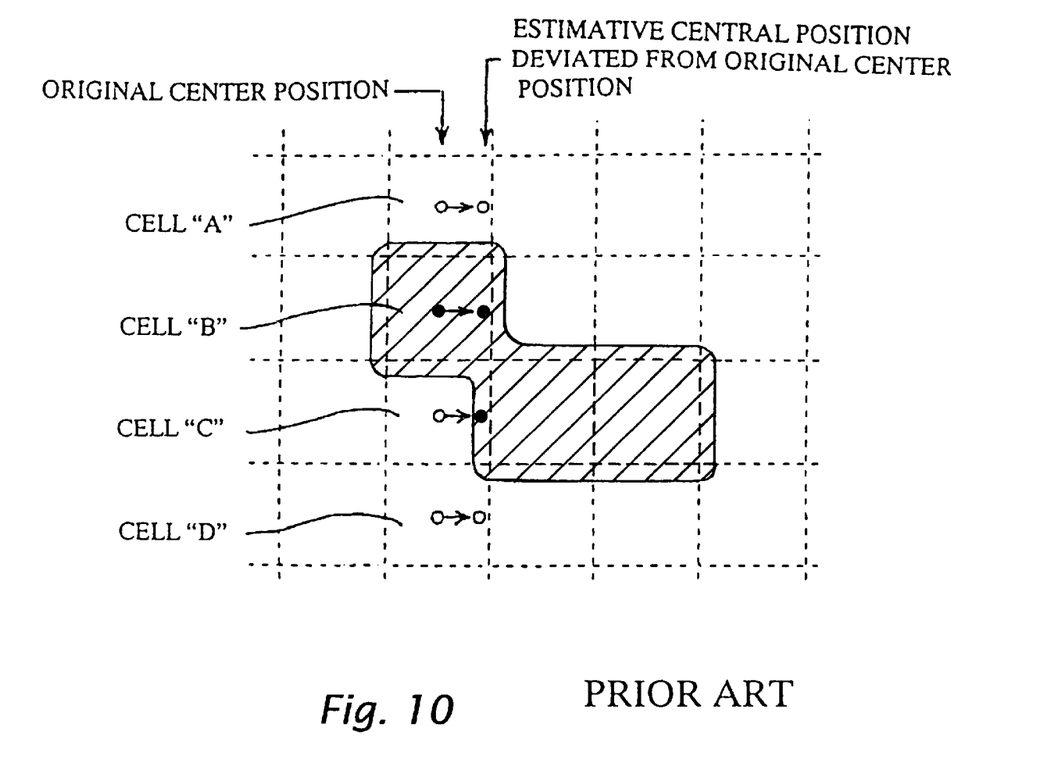
FIG. 10 is a view illustrating the mechanism of causing an erroneous detection due to the expanded black cells.

FIG. 10 shows an example of two-dimensional code including a growing-fat dark cell. Each dark cell has peripheral sides overhanging over neighboring bright cells. The above-described estimative central position of the dark cell may deviate largely into the overhung region. In such a case, a bright cell will be erroneously detected by as a dark cell. This drawback will be explained in more detail with reference to FIG. 10. A cell "A" and a cell "D" shown in FIG. 10 are originally bright cells and are discriminable as bright cells even at their deviated estimative center positions. A cell "B" is originally a dark cell and is discriminable as a dark cell even at its deviated estimative central position. However, a cell "C" is judged as a dark cell although it is originally a bright cell because a neighboring (i.e. right) dark cell overhangs over the deviated estimative central position of the cell "C". Thus, the bright cell "C" is erroneously judged as a dark cell. Thus, the data, represented by the brightness and darkness of the cells, is undesirably changed into another data having different contents or meaning.

The above-described explanation is for the growing-fat phenomenon of the dark cells, but is equally applied to the growing-fat phenomenon of the bright cells. In this case, the bright cells overhang over the dark cells. The dark cell is erroneously judged as a bright cell when its estimative central position is located in the overhanging region of the bright cell.

SUMMARY OF THE INVENTION

In view of the foregoing, the present invention has an object to provide an apparatus and a method for producing print data of a two-dimensional code which is capable of preventing erroneous judgement in the reading of the data, even when a facsimile or copying machine prints out a two-dimensional code including growing-fat dark cells. Furthermore, the present invention provides recording media which store program data required for executing the processing for producing the print data.

To accomplish the above and other related objects, the present invention provides an apparatus for producing print data of a two-dimensional code. The two-dimensional code comprises cells representing binary coded data and arranged as a pattern on a two-dimensional matrix. The pattern comprises dark and bright cells. The printing operation is performed by printing only dark cells while leaving a non-printed region which is discriminable as the bright cells. A print data producing means is provided for producing print data for modifying the size of the dark cells in advance so that a boundary between the dark cells and the bright cells is adjustable before performing the printing operation.

According to the present invention, it is preferable that the print data producing means is for producing the print data for expanding the cell size of each dark cell when the boundary between the dark cells and the bright cells is shifted toward the region of the bright cells, and is for producing the print data for expanding the cell size of each bright cell when the boundary between the dark cells and the bright cells is shifted toward the region of the dark cells.

In general, the print data are developed as a matrix pattern of 0 and 1 representing bright and dark portions on a bit map. Accordingly, when the regular-size cell has a cell size of 5 dots×5 dots, expansion of the dark cell is performed by increasing the cell size to 6 dots×6 dots and developing the expanded dark cell on the bit map. When the dark cell is expanded to the size of 6 dots×6 dots, the expanded dark cell (1) overhangs over a neighboring bright cell (0) or dark cell (1). In this case, dark (1) is selected in the overlapped region unless both of the overlapped cells are bight (0).

On the other hand, shrinkage of the dark cell is performed by increasing the cell size of the bright cell to 6 dots×6 dots and developing the expanded bright cell on the bit map. When the bright cell is expanded to the size of 6 dots×6 dots, the expanded bright cell (0) overhangs over a neighboring dark cell (1) or bright cell (0). In this case, bright (0) is selected in the overlapped region unless both of the overlapped cells are dark (1). As a result, the cell size of the dark cell is reduced to 4 dots×4 dots. No shrinkage occurs in the overlap region of dark cells.

Figure 11A:
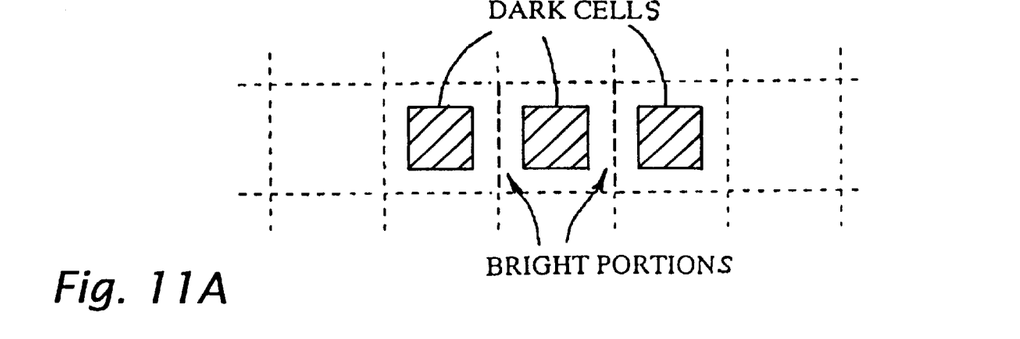
FIGS. 11A to 11C are views illustrating the mechanism of causing an erroneous detection due to the shrunk black cell.
Figure 11B:
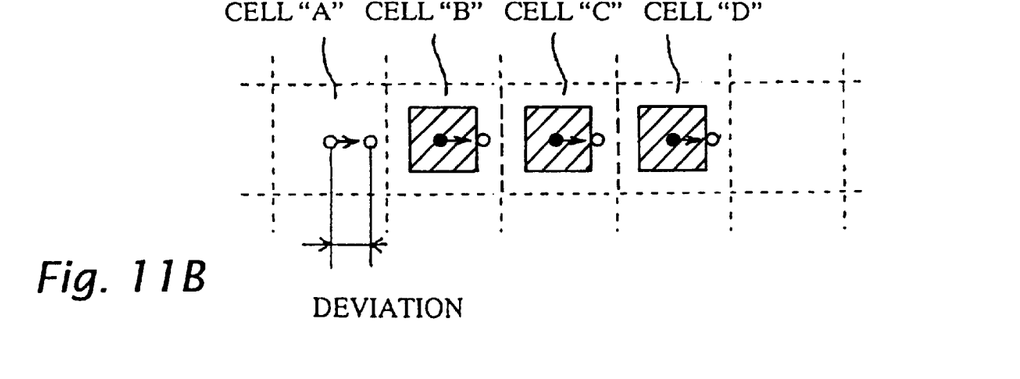
Figure 11C:
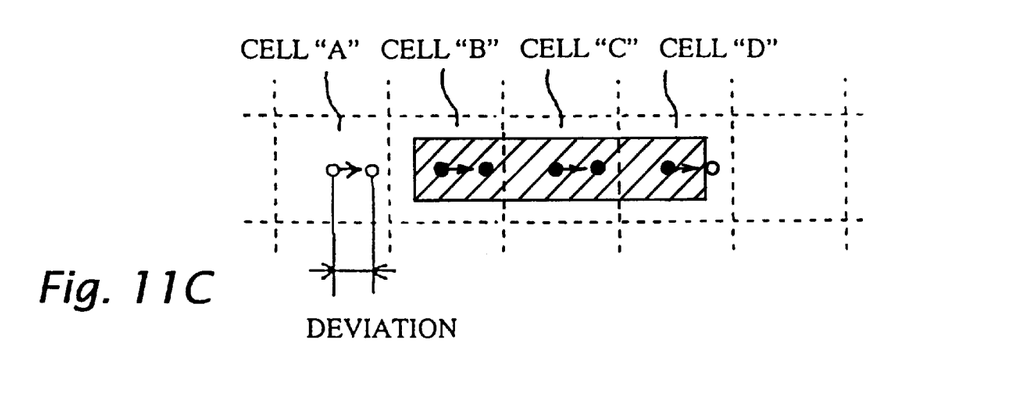

According to the present invention, it is preferable to perform the shrinkage of the dark cells by expanding the cell size of bright cells, not by shrinking the cell size of dark cells, although the same result is obtained. This is explained in more detail with reference to FIGS. 11A to 11C. In shrinking the dark cells, it is necessary to cause no shrinkage in the boundary region where two dark cells are positioned next to each other. In other words, the shrinkage of dark cells is only allowed in the region where black and while cells are positioned next to each other. If the shrinkage is performed in each black cell, undesirable bright portions will appear between neighboring black cells as shown in FIG. 11A. If the deviated estimative cell centers are positioned in the undesirable bright portions as shown in FIG. 11B, the dark cells will be erroneously recognized as bright cells. In FIG. 11B, the cell "a" is correctly judged as a bright cell even at the deviated estimative central position. However, other cells "b", "c" and "d" are erroneously judged as bright cells as their deviated estimative central positions are located in the bright portions. If "n" dark cells are aligned adjacent to each other and deviated in the same manner, all of them will be erroneously judged. To solve this problem, it is essential to form no bright portions between adjacent dark cells as shown in FIG. 11C. In this case, the cell "d" may be erroneously judged as a bright cell. However, other cells "b" and "c" are correctly judged as dark cells. In short, the judgement is correctly performed for all of "n" cells except one. The remaining one cell may be erroneously judged. This is not applied to dark cells not aligned adjacent to each other.

To the contrary, the shrinkage of the dark cells is simply performed by increasing the cell size of the bright cells. All thing necessary to do is selecting white (0) when the expanded bright cell (0) overhangs over the dark cell (1). The data processing is simple.

Enlargement of the cell size of the dark or bright cell is performed by adding a line or row of dots along one or more sides of the cell. In this case, it is preferable that the enlargement is performed along two adjacent sides or all of the four sides of the cell. For example, the enlargement of the cell size can be accomplished by adding a line of dots along a lateral side of the cell and further adding a row of dots along an adjacent longitudinal side. In this case, the two sides of the cell need to be designated beforehand. Similarly, the enlargement of the cell side can be accomplished by adding a line or row of dots along all of the four sides of the cell. When the cell is increased by 3 dots in each of the longitudinal and lateral directions, it is preferable to add two lines of dots along one lateral side of the cell and two rows of dots along an adjacent longitudinal side, and further add a line of dots along an opposed lateral side and a row of dots along an opposed longitudinal side. In this manner, the enlargement of the cell size can be easily realized by increasing the longitudinal and lateral sides of the cell by an amount of "n" dots (n is an integer equal to or larger than 1).

According to the present invention, the print data of the two-dimensional code can be produced for intentionally adjusting the cell size of the dark cells beforehand. Thus, even when the dark cells grow fat or get thin through the reading operation of the two-dimensional code by the facsimile or copying machine, it becomes possible to equalize the printed cell to the regular-size cell or suppress the difference between them.

Furthermore, it is preferable to perform the enlargement of the cell size based on operator's instructions. To this end, an input means is provided for allowing the operator to enter a side or sides of a dark or bright cell to be expanded or shrunk as well as the degree of expansion or shrinkage. The print data producing means produces the print data for modifying the dark or bright cells based on the information relating to the side or sides to be modified and the size modification degree which are both entered through the input means. The growing-fat or getting-thin degree of each dark cell depends on individual facsimile or copying machines or may vary in accordance with reading conditions. Accordingly, it is preferable that the operator can optimize the settings of the prior cell size adjustment based on actually observed cells on the two-dimensional code.

The above-described print data producing apparatus is effectively used in a mail-order selling system. A purchase order includes a two-dimensional code printed based on the print data produced by the print data producing apparatus of the present invention. The printed purchase order is then transmitted from a buyer to a seller through facsimile communications (i.e., data reading and transmission). The present mail-order selling systems using the telephone and facsimile communications are still major, although the electronic transaction using the Internet has been recently developing. Many of retailers and small companies rely on printed documents in stock dealing. In such cases, a purchase order is printed by a buyer. The printed purchase order is then read by a buyer's facsimile and transmitted to a seller. Then, a seller's facsimile receives the purchase order with a two-dimensional code representing the contents of the purchase order. The operator of the seller uses a scanner to read the encoded data from the two-dimensional code printed on the received purchase order. The readout data is registered in a managing computer or the like. Thus, the order receiving processing is simple.

In this manner, the two-dimensional code print data producing apparatus of the present invention is effectively used when all of the transaction cannot be systemized by the electronic processing. It is preferable that the print data includes at least one positioning symbol located at a corner of the two-dimensional matrix, and the positioning symbol is used for identifying the position of the two-dimensional code. This two-dimensional code is generally referred to as a QR code. Needless to say, the present invention is applicable to other two-dimensional codes, such as a data code, a CP code, a veri code, and a calra code.

The two-dimensional code print data producing apparatus of the present invention can be realized by a computer system. In this case, the computer system comprises a program for producing the print data of a two-dimensional code in accordance with the present invention. The program itself can be recorded in an appropriate recording medium, such as a floppy disk, a magnetooptic disk, or a CD-ROM. The recorded program is arbitrarily loadable from the recoding medium to the computer system. For example, the sellers handling the mail-order selling system usually send a merchandise catalog by mail to prospective buyers beforehand so that the buyers can select their favorite goods from the catalog. However, considering the wide spread use of personal computers and price down of recording media, it is possible to send a CD-ROM storing merchandise information instead of sending the catalog book. In such cases, it is preferable that the CD-ROM stores the program for producing the print data in accordance with the present invention together with the merchandise information. It is also possible to store the program in a ROM or a backup RAM (including a non-volatile RAM) which is installed in the computer system.

Another aspect of the present invention provides a method for producing print data of a two-dimensional code comprising dark and bright cells representing binary coded data and arranged as a pattern on a two-dimensional matrix. The method comprises the steps of developing a matrix pattern of dark and bright cells of regular size on a bit map, and modifying the cell size of specific cells on the bit map so that a boundary between the dark cells and the bright cells is adjustable before performing a printing operation.

Preferably, the two-dimensional print data producing method further comprises a step of outputting a dot arrangement image to a printer. The printer prints only dark cells while leaving a non-printed region which is discriminable as the bright cells.

Furthermore, another aspect of the present invention provides a recording medium storing a program for producing print data of a two-dimensional code comprising dark and bright cells representing binary coded data and arranged as a pattern on a two-dimensional matrix, characterized in that the program is recorded in a format readable by a computer, and the print data is for modifying the size of the dark cells in advance so that a boundary between the dark cells and the bright cells is adjustable before performing a printing operation.

BRIEF DESCRIPTION OF THE DRAWINGS

The above and other objects, features and advantages of the present invention will become more apparent from the following detailed description which is to be read in conjunction with the accompanying drawings, in which:

FIGS. 7A1 to 7A4 are views showing examples of black cells printed by a printer of the buyer's unit, while FIGS. 7B1 to 7B4 are views showing dark cells printed by a facsimile machine of a seller's unit;

DESCRIPTION OF THE PREFERRED EMBODIMENT

A preferred embodiment of the present invention will be explained with reference to attached drawings.

Figure 1:
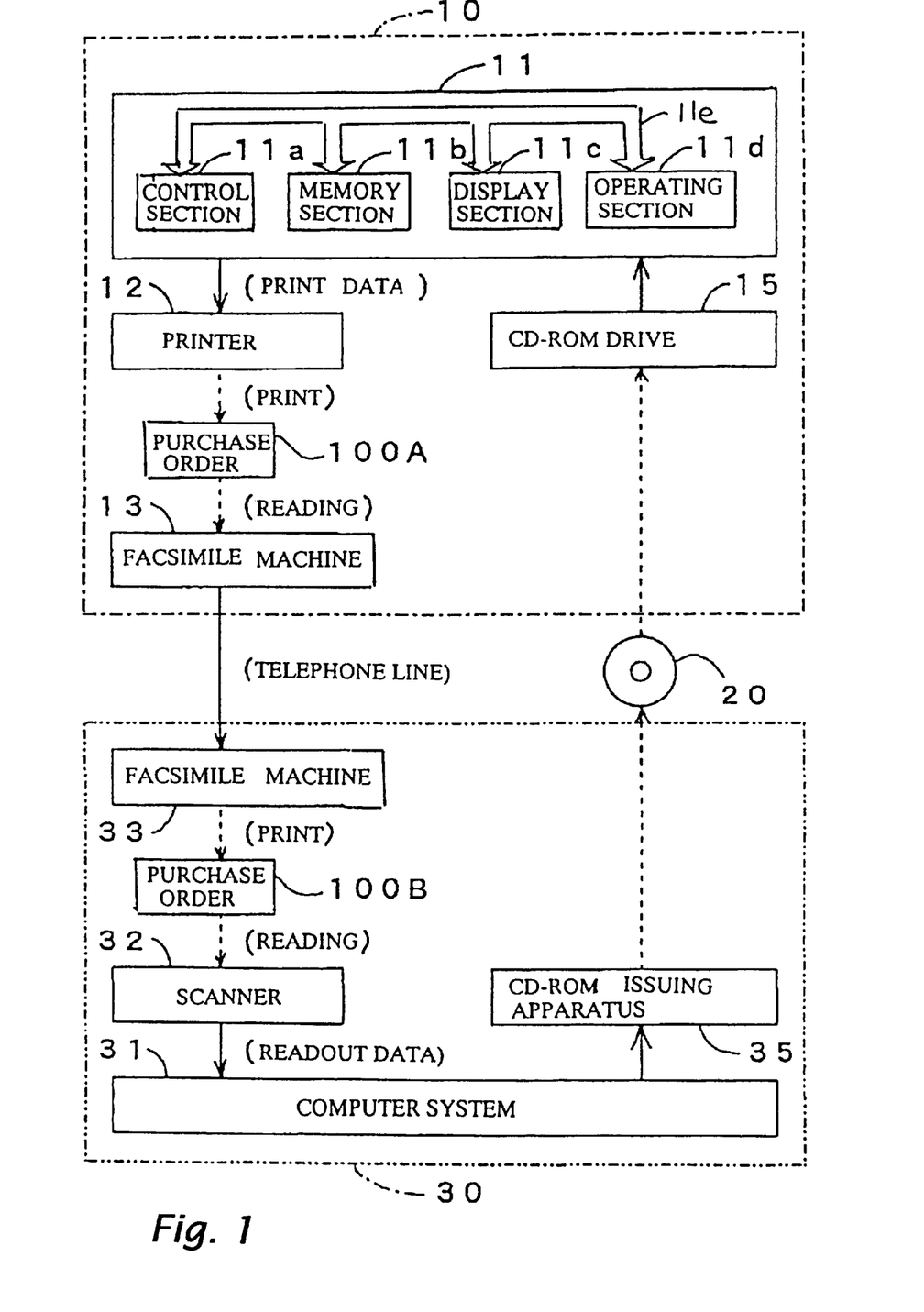
FIG. 1 is a block diagram showing the schematic arrangement of a mail-order selling system in accordance with a preferable embodiment of the present invention.

FIG. 1 is a block diagram showing the schematic arrangement of a mailorder selling system embodying the present invention. This mail-order selling system comprises a buyer's unit 10 and a seller's unit 30 which are connected via a telephone line.

Figure 2:
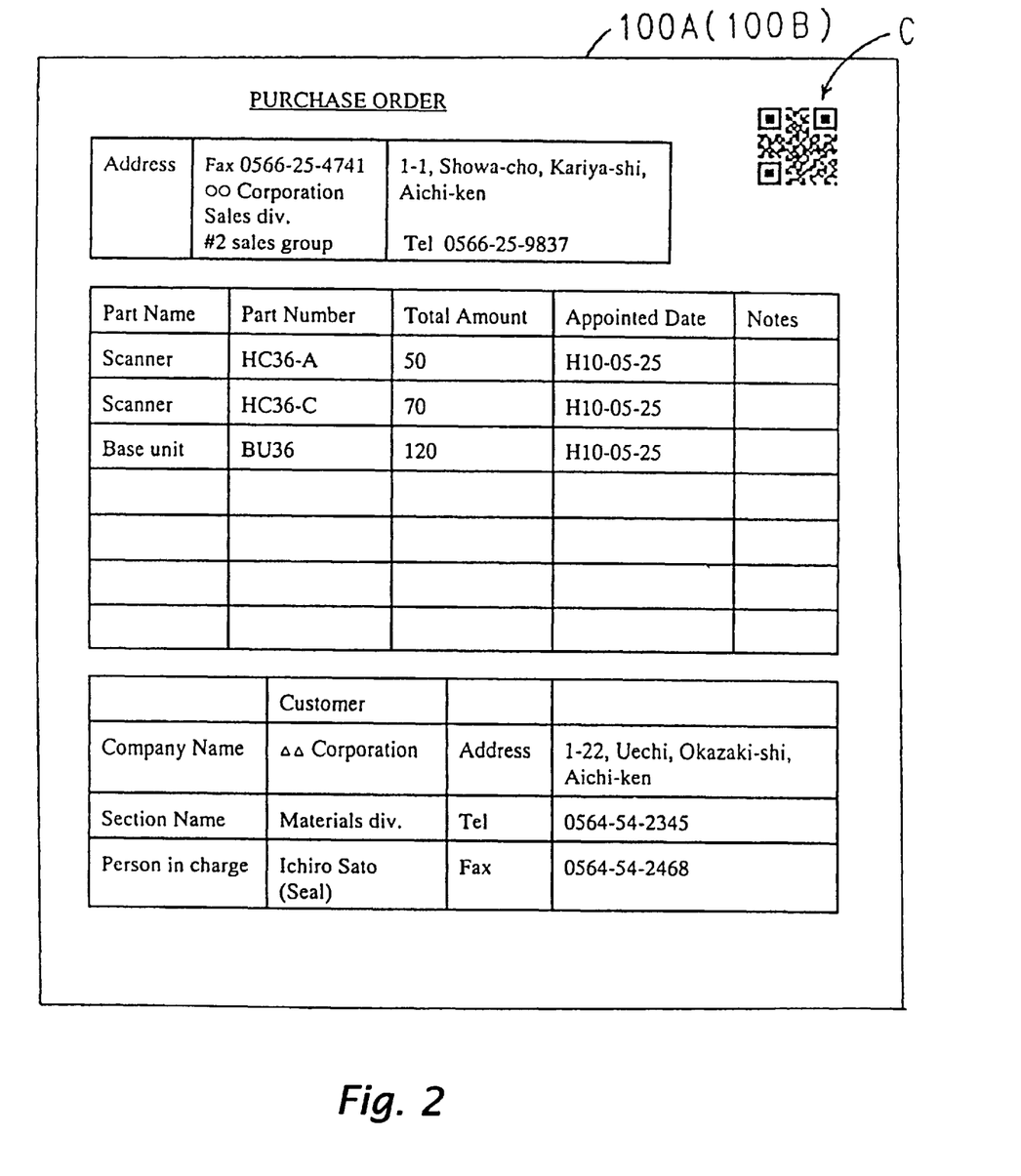
FIG. 2 is a view showing a sample of a purchase order in which a two-dimensional code is printed in addition to order contents.

The buyer's unit 10 comprises a computer system 11 (serving as an apparatus for producing print data of a two-dimensional code), a printer 12, a facsimile machine 13, and a CD-ROM drive 15. The computer system 11 comprises a control section 11a (serving as a data producing means), a memory section 11b, a display section 11c, and an operating section 11d (serving as an input means) which are connected via a bus 11e. An operator enters information or data to be described on a purchase order through the operating section 11d. The control section 11a develops various data on a bit map of the memory section 11b. The developed data on the bit map includes the character data to be described on the purchase order as well as two-dimensional coded data representing the character data. The two-dimensional coded data serves as the print data. The print data is sent to the printer 12 which prints out a purchase order 100A. FIG. 2 shows an example of the purchase order 100A printed by the printer 12 based on the print data. The facsimile machine 13 reads the printed purchase order 100A and transmits the readout data to the seller's unit 30 via the telephone line.

The CD-ROM drive 15 is used to read the data from a CD-ROM 20. According to this embodiment, the CD-ROM 20 is issued from the seller's unit 30 and sent to the buyer by mail. The CD-ROM 20 stores the merchandise information necessary for ordering the products. Furthermore, the CD-ROM 20 stores a computer program used when the purchase order 100A is filled out in accordance with a predetermined format. Using this order program can eliminate any possible errors when the buyer writes the necessary information on the purchase order 100A. The filled-out purchase order 100A can be smoothly processed at the seller's unit 10. The order program further comprises print data used when the input information of the purchase order 100A is converted into a two-dimensional code (corresponding to the print data of a two-dimensional code). Based on the print data created in accordance with the order program, the printer 12 prints out the purchase order 100A shown in FIG. 2, which comprises the character or numerical data printed in accordance with the predetermined format as well as a two-dimensional code "C" located at the upper right position. Details of the two-dimensional code will be described later.

On the other hand, as shown in FIG. 1, the seller's unit 30 comprises a computer system 31, a scanner 32, a facsimile machine 33, and a CD-ROM issuing machine 35. The facsimile machine 33 receives the facsimile data transmitted via the telephone line from the facsimile machine 13 of the buyer's unit 10, and outputs (i.e., prints out) a purchase order 100B. The scanner 32 reads the two-dimensional code "C" on the purchase order 100B.

Figure 3:
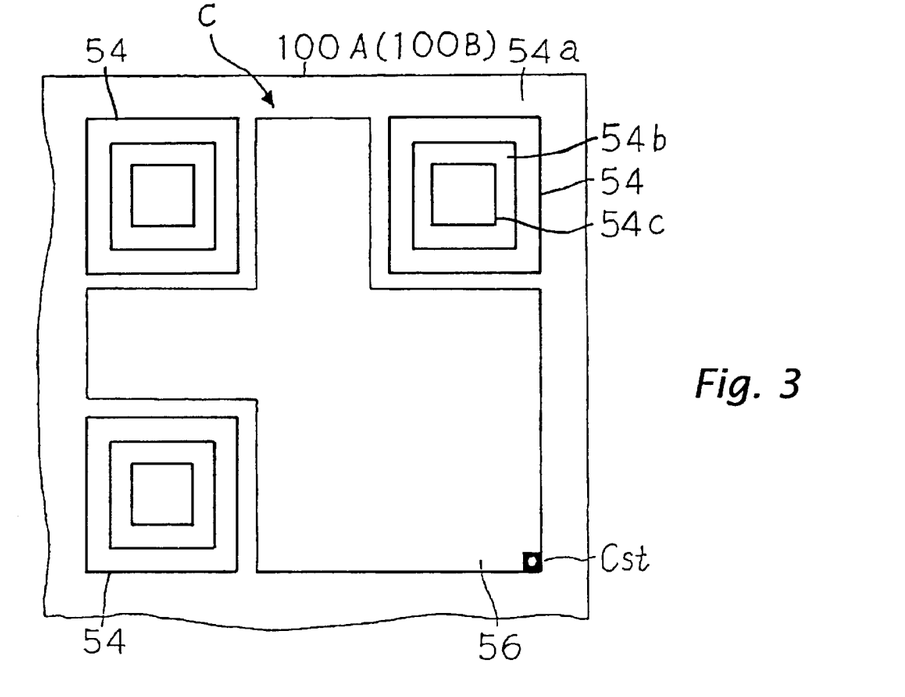
FIG. 3 is a schematic view showing an example of the two-dimensional code.

The scanner 32, comprising a CCD, a binary-coding circuit, a video memory, and a control circuit, reads and deciphers the two-dimensional code "C". Hereinafter, the two-dimensional code "C" will be explained in more detail. As shown in FIG. 3, the two-dimensional code "C" is printed in a white marginal region of the purchase order 100A. The two-dimensional code "C" comprises a total of three positioning symbols 54, as well as an origin cell Cst and a remaining data region 56. The entire region of the two-dimensional code "C" is a square having each side consisting of the same number of cells. For example, the two-dimensional code "C" includes 441 cells (=21 cells× 21cells). Each cell is either one of two optically discriminable cells, such as white (=bright) and black (=dark) cells, although no data cell pattern is depicted in the data region 56.

Figure 4:
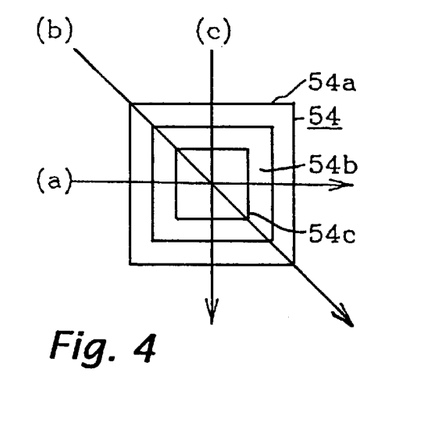
FIGS. 4A and 4B are views cooperatively illustrating a method for detecting bright and dark portions in the scanning of a position determining symbol.
Figure 4A:
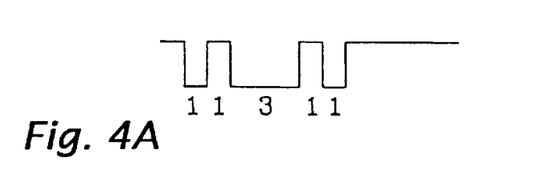

The three positioning symbols 54 are disposed at three corners selected from the four corners of the two-dimensional code "C". The cell pattern of each positioning symbol 54 comprises a large square region 54a of black cells, a middle square region 54b of white cells, and a smaller square region 54c of black cells. The middle square region 54b is involved in the large square region 54a, and the smaller square region 54c is involved in the middle square region 54c. The square regions 54a, 54b and 54c are concentric and similar (i.e., proportional in size). The darkness and brightness of the black and white cells is detected through the scanning of the positioning symbol 54. FIG. 4A shows three representative scanning lines (a), (b) and (c) each crossing the center of the positioning symbol 54.

Figure 4B:
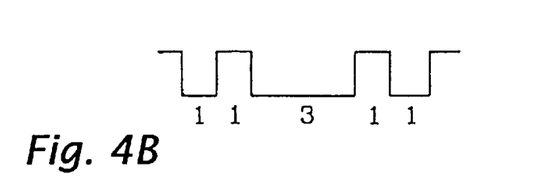
Figure 4C:
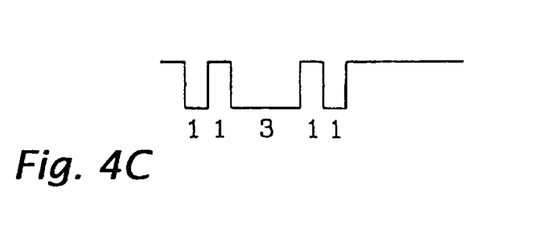

FIG. 4B shows binary-coded signals representing the bright-and-dark pattern detected along the scanning lines (a), (b) and (c), respectively. Each binary-coded signal, having either a high level or a low level, has a bright-and-dark pattern of 1(Low): 1(High): 3(Low): 1(High): 1(Low). The "Low" level is responsive to the detection of the black cell, while the "High" level is responsive to the white cell. The bright-and-dark pattern of 1:1:3:1:1 is always obtained when the scanning line crosses the center of the positioning symbol 54, regardless of the inclination angle of the scanning line.

The position of the two-dimensional code "C" is calculated by detecting all of three positioning symbols 54 each having the specific bright-and-dark pattern of 1:1:3:1:1. Then, based on the positions of the detected positioning symbols 54, a whole square region of the two-dimensional code "C" can be identified. The unexamined Japanese patent publication No. 8-180,125 discloses the details of the computational processing or the structural arrangement of the scanner 32.

The readout data, i.e., decoded data, is sent from the scanner 32 to the computer system 31. The computer system 31 performs the predetermined purchase order processing based on the decoded data. Using the scanner 32 is advantageous in eliminating any possible mistakes done by an operator if he/she manually reads the character data on the printed purchase order 100B received from the facsimile machine 33 and enters the readout data into the computer system 31.

The CD-ROM issuing machine 35 issues the CD-ROM 20 based on the commands sent from the computer system 31. The issued CD-ROM 20 is read by the CD-ROM drive 15 of the above-described buyer's unit 10 as described in the foregoing description.

According to the above-described mail-order selling system, in the buyer's unit 11, the purchase order 100A is printed by the printer 12 and read by the facsimile machine 13. In the seller's unit 30, the facsimile machine 33 prints out the purchase order 100B and the scanner 32 reads the data from the printed purchase order 100B. In this case, the purchase order 100B is fundamentally identical with the purchase order 100A.

Figure 7A:
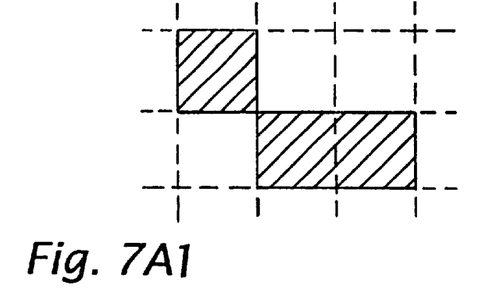
Figure 7A:
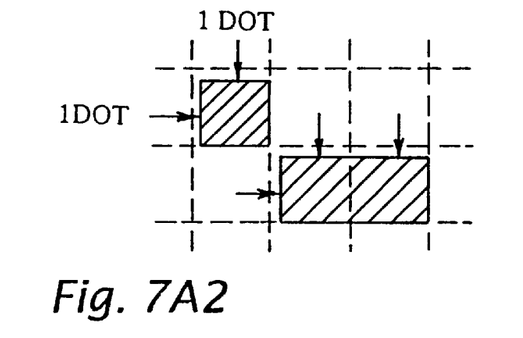
Figure 7A:
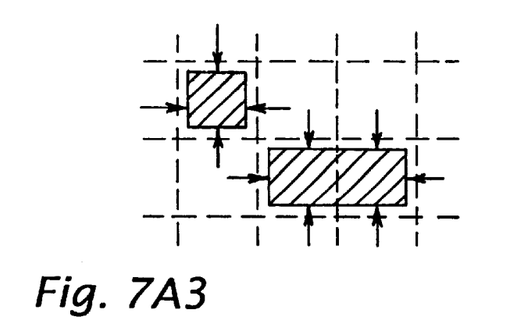

However, there is a possibility that the black cell (i.e., dark cell) in the two-dimensional code "C" (i.e., copy) of the purchase order 100B may slightly expand (i.e., grow fat) or shrink (i.e., get thin) compared with the corresponding black cell in the two-dimensional code "C" (i.e., original) of the purchase order 100A. FIGS. 7A1 to 7A3 show several samples of the black cells printed by the printer 12 of the buyer's unit 10. These black cells tend to grow fat when printed by the facsimile machine 33 of the seller's unit 30, as shown in FIGS. 7B1 to 7B3, respectively. When the two-dimensional code "C" comprises such expanded black cells, there will be a possibility that a white cell (i.e., a bright cell) read by the scanner 32 may be erroneously recognized as a black. Decoded data will involve errors.

Regarding the reasons why the black cells grow fat or why the white cells are erroneously recognized as black cells, the previously-described prior art problems explained with reference to FIGS. 9 and 10 should be referred to.

Figure 7A:
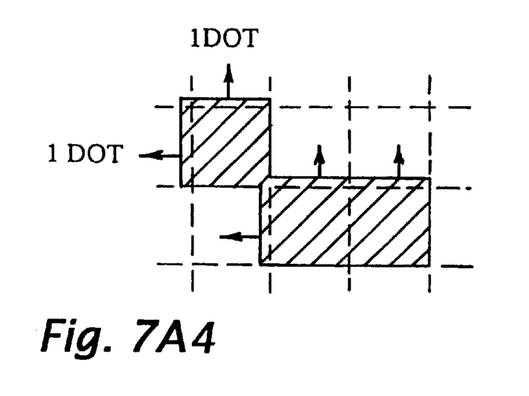
Figure 7B:
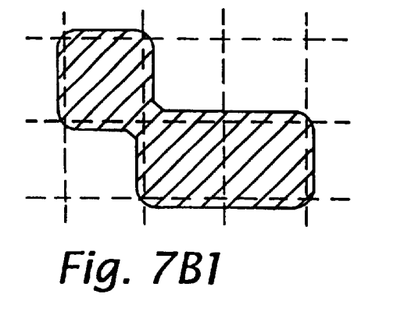
Figure 7B:
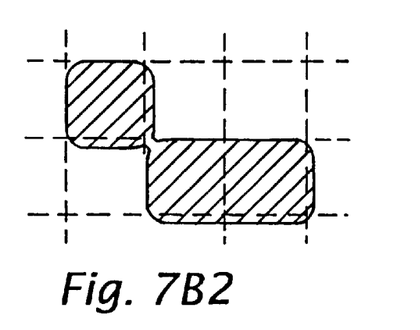
Figure 7B:
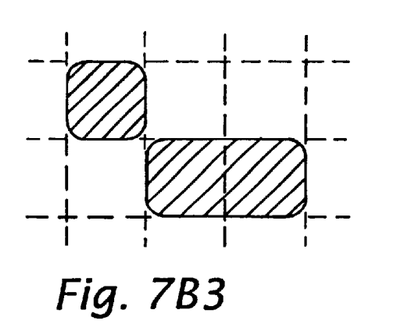
Figure 7B:
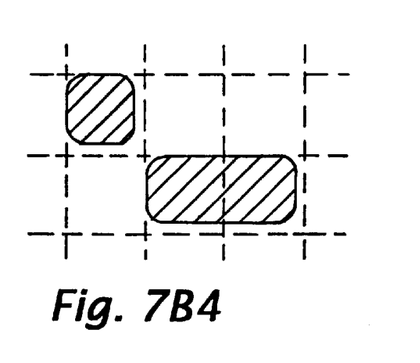

O the other hand, as shown in FIGS. 7A4 and 7B4, the black cells may get thin. In this case, there will be a possibility that a black cell (i.e., a dark cell) read by the scanner 32 may be erroneously recognized as a white. However, there is a high possibility that the black cells grow fat as described above. Therefore, the following explanation will be described from the view point that the adverse influences are chiefly given by the expanded black cells. If necessary, the influence of the thinned black cells will be added occasionally.

According to the present invention, the black cells are thinned (or expanded) beforehand to eliminate the adverse influences. More specifically, the black cells are intentionally thinned (expanded) when the purchase order 100A is printed out by the printer 12 of the buyer's unit 10. Thus, when the purchase order 100B is printed out by the facsimile machine 33 of the seller's unit 30, the printed two-dimensional code "C" consists of appropriate cells each having a regular size. To realize this, the computer system 11 of the buyer's unit 10 controls or adjusts the production of the print data. Next, details of the print data producing processing performed in the computer system 11 of the buyer's unit 10 will be explained.

Figure 5:
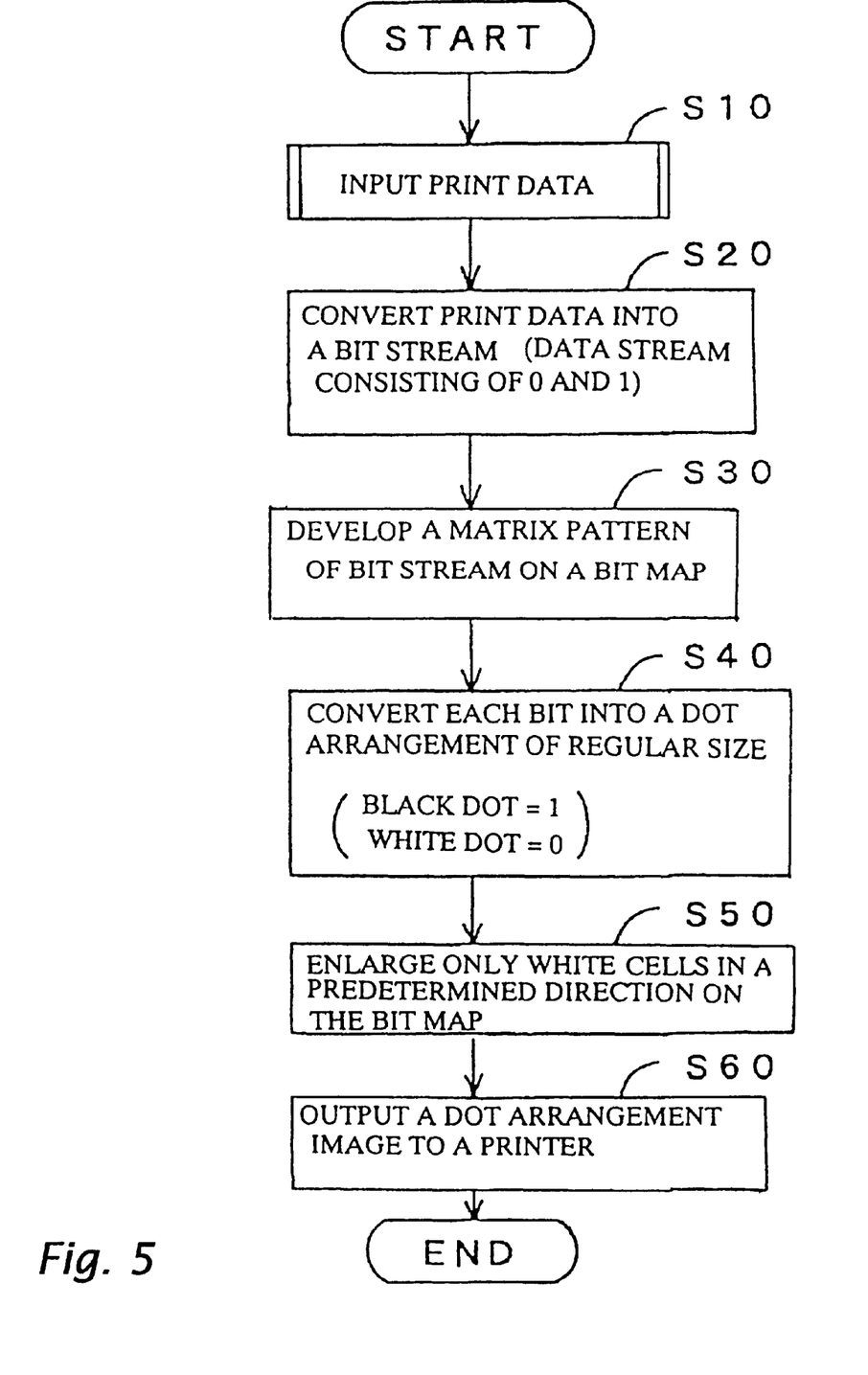
FIG. 5 is a flowchart showing the details processing for producing print data, which is performed in a computer system of a buyer's unit.

FIG. 5 is a flowchart showing the print data producing processing performed in the control section 11a of the computer system 11 according to the program which is read out from the CD-ROM 20 by the CD-ROM drive 15.

First, in a step S10, print data are entered. More specifically, the control section 11a reads a purchase order format out of the CD-ROM 20. The display section 11c displays the readout purchase order. An operator manipulates the operating section 11d to enter necessary data or information. The operator can obtain the merchandise information necessary for ordering the products from the CD-ROM 20. Thus, the operator can smoothly enter the ordering data with reference to the readout merchandise information. After finishing the print data entering operation in the step S10, the control flow proceeds to a step S20.

In the step S20, the entered print data is converted into a bit stream, i.e., a data stream consisting of 0 and 1. All of the purchase order 100A shown in FIG. 2, except for the two-dimensional code "C", can be printed based on this bit stream. Subsequently, in steps S30 to S50, the print data for the two-dimensional code "C" is produced based on the bit stream.

Figure 6A:
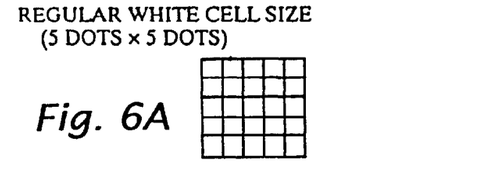
FIGS. 6A to 6F are views explaining expansion of the cell size and showing an example of the cell displacement.
Figure 6B:
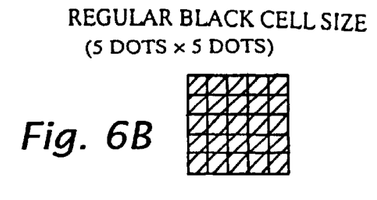

In the step S30, the bit stream of the print data obtained in the step S20 is developed in a matrix pattern on the bit map of the memory section 11b. Next, in the step S40, each bit is converted into a dot arrangement of a regular size. The black dot is assigned to 1 and the white dot is 0. As shown in FIGS. 6A and 6B, the regular size of the white cells and the black cells is 5 dots×5 dots. Thereafter, in the step S50, only the white cells are enlarged in a predetermined directions on the bit map. Then, in a step S60, the resultant dot arrangement image is sent to the printer 12. The printer 12 prints out the purchase order 100A based on the received dot arrangement image.

The enlargement of the white dots performed in the step S50 will be explained in more detail.

Figure 6C:
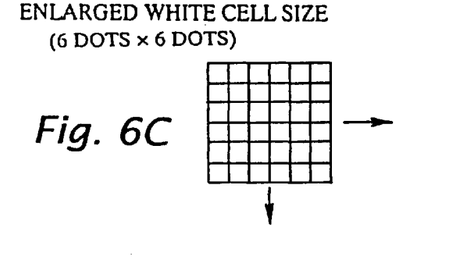
Figure 6D:
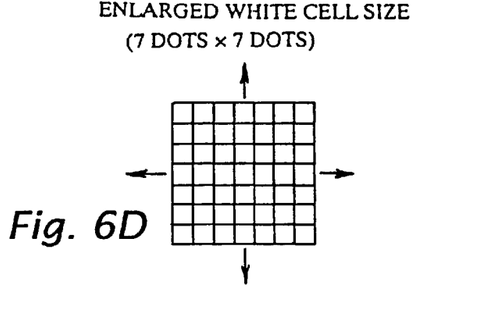

FIG. 6A shows a regular-size white cell consisting of 5 dots×5 dots. FIG. 6C shows an enlarged white cell consisting of 6 dots×6 dots. The enlargement amount is 1 dot in each of the longitudinal and lateral directions. FIG. 6D shows another enlarged white cell consisting of 7 dots×7 dots with the enlargement amount of 2 dots in each of the longitudinal and lateral directions. According to this embodiment, the regular-size white cell is enlarged to the size of 6 dots×6 dots by increasing a row or line of white dots along the right and bottom sides. On the other hand, the regular-size white cell can be enlarged to the size of 7 dots×7 dots by increasing a row or line of white dots along all of the right, left, top, and bottom sides. Although not shown in the drawing, the regular-size white cell can be enlarged to the size of 8 dots×8 dots by increasing two rows or lines of white dots along the right and bottom sides and increasing one row or line of white dots along the left and top sides.

Figure 6E:
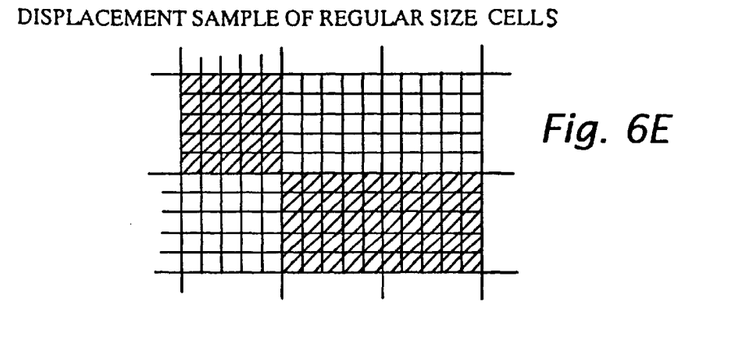
Figure 6F:
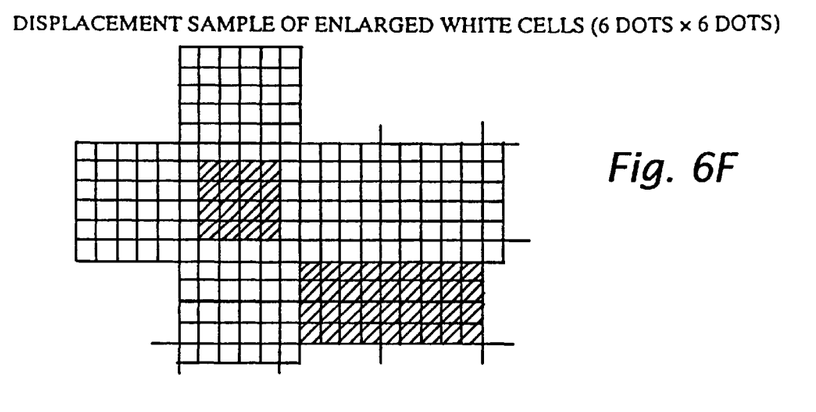

FIG. 6E shows an arrangement or displacement of regular-size black and white cells. FIG. 6F shows a modified arrangement or displacement of the black and white cells wherein only the white cells are enlarged to the size of 6 dots×6 dots. As apparent from FIG. 6F, the black cells are shrunk by an amount equivalent to the increased amount of the white cells in a complementary manner. In other words, the shrinkage of the black cells occurs in the region where the expanded white cells overhang over the black cells. No shrinkage of the black cells occurs in the boundary between two black cells which are located next to each other. Needless to say, a region where one white cell overhangs over another white cell remains white. This is simply realized by outputting 0 for the region where the white dot (0) and the black dot (1) are overlapped and by outputting 0 for the region where two white dots (0) are overlapped.

As shown in FIG. 7A2, when the white cells are enlarged to the 6 dots×6 dots size, the printed black cells on the purchase order 100A are shrunk by an amount of one dot along the left and top side. When the purchase order 100A including the enlarged 6 dots×6 dots while cells is transmitted to the facsimile machine 33, the black cells grow fat on the copied purchase order 100B as shown in FIG. 7B2. However, the fat black cells do not overhang excessively over the white cell region due to the prior shrinkage performed in advance. In other words, the shrinkage degree of the black cells on the purchase order 100A is determined so that each black cell can be substantially equalized in size to the regular-size cell when copied on the purchase order 100B. In the same manner, when the white cell is enlarged to the 7 dots×7 dots size as shown in FIG. 7A3, the printed black cell on the purchase order 100A is shrunk by an amount of one dot along all of the right, left, top and bottom sides. When the purchase order 100A including the enlarged 7 dots×7 dots white cells is transmitted to the facsimile machine 33, the black cells grow fat on the copied purchase order 100B as shown in FIG. 7B3. However, the fat black cells do not overhang over the white cell region due to the prior shrinkage.

As explained in the foregoing description, the present invention provides the computer system 11 of the buyer's unit 10 which produces the print data for performing the prior shrinkage of the black cells on the two-dimensional code. The purchase order 100A, printed based on the print data, is transmitted to the seller via the facsimile machines 13 and 33. The black cells subjected to the prior shrinkage grow fat through the data and image transmission by the facsimile machine 33, so that each black cell can be substantially equalized in size to the regular-size cell when the two-dimensional code is printed on the purchase order 100B. Accordingly, even when the estimative central position is deviated, it becomes possible to eliminate any erroneous judgement in the data reading from the two-dimensional code.

According to this embodiment, the shrinkage degree of the black cells can be arbitrarily determined by the operator. As a practical problem, the growing-fat amount of each black cell depends on the facsimile machines 13 and 33 and may vary in accordance with reading conditions. Accordingly, the operator can make a self-judgement based on actually observed cells on the two-dimensional code. Thus, the settings of the prior shrinkage can be optimized appropriately.

According to the above-described embodiment, the shrinkage of the black cells is performed by expanding the white cells, not by shrinking the black cells themselves. This is advantageous in the following points.

In the shrinkage of the black cells, it is necessary to cause no shrinkage in the region where two black cells are positioned next to each other. In other words, the shrinkage of the black cells is only allowed in the region where black and while cells are positioned next to each other. If the shrinkage is performed in each black cell, an undesirable bright portion will appear between two neighboring black cells. If the deviated estimative cell center is positioned in this undesirable bright portion, the black cell will be erroneously recognized as a white cell. On the other hand, according to this invention, the intended shrinkage of the black cell is realized by simply enlarging the white cells. All thing necessary to do is selecting white (0) when the white dot (0) and the black dot (1) are overlapped. The data processing is simple.

The above-described processing is similarly applied to a case where the black cells have tendency of shrinking through the facsimile transmission. FIG. 6B shows a regular-size black cell of 5 dots×5 dots. If the black cell is expanded to the size of 6 dots×6 dots, the expanded black cell will overhang over a neighboring white cell when developed on the bit map. In this case, black (1) is selected in a region where the white dot (0) and the black dot (1) are overlapped and black (1) is selected in a region where black dots (1) are overlapped.

FIG. 7A4 shows an enlarged black cell consisting of 6 dots×6 dots, which is obtained by enlarging the regular-size black cell by one dot along the left and top sides. When the purchase order 100A including the enlarged 6 dots×6 dots black cells is transmitted to the facsimile machine 33 of the seller's unit 30, the black cells get thin on the copied purchase order 100B as shown in FIG. 7B4. In this case, the thinned black cell is similar in size to the regular-size black cell due to the prior expansion.

Figure 8A:
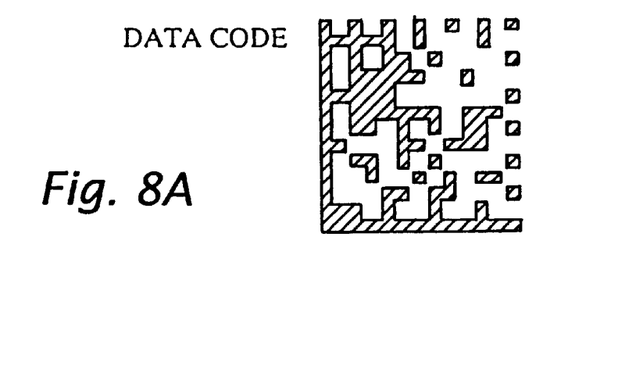
FIGS. 8A to 8D are views showing other examples of the two-dimensional code to which the present invention is applied.
Figure 8B:
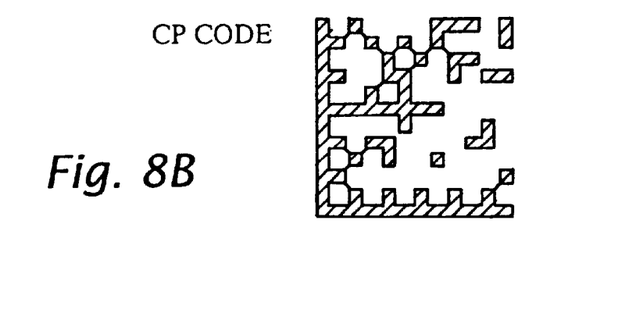
Figure 8C:
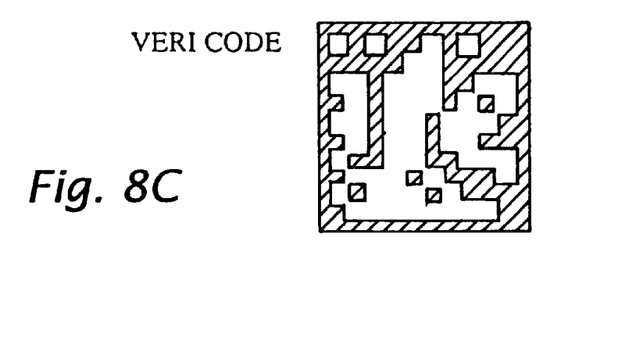
Figure 8D:
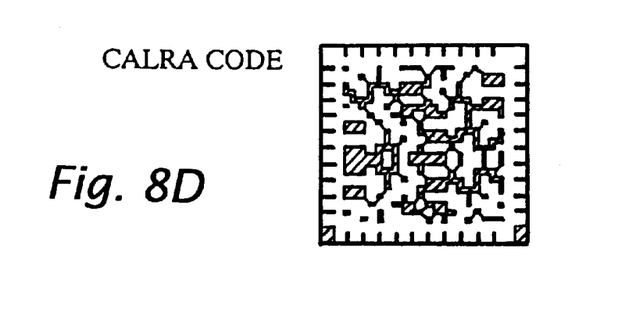

The two-dimensional code "C" used in the above-described embodiment is generally referred to as the "QR" code. However, the present invention can be applied to other two-dimensional codes, such as a data code shown in FIG. 8A, a CP code shown in FIG. 8B, a veri code shown in FIG. 8C, and a calra code shown in FIG. 8D.

According to the above-described embodiment, the two-dimensional code "C" is printed on the purchase order used in the mail-order system. The growing-fat phenomenon of the black cells was explained as occurring in the reading operation of the purchase order 100A through the facsimile machine 13. However, the similar growing-fat phenomenon of the black cells will be found in the reading operation performed by a copying machine. Accordingly, if the document with the two-dimensional code is to be repetitively copied, it will be preferable to print an original so that the black cells are subjected to the prior shrinkage (or prior expansion). Furthermore, the growing-fat phenomenon of the black cells is observed in an ink-jet type printer because the printed ink spreads.

Moreover, instead of using the CD-ROM 20, the program can be stored in other recording media, such as a floppy disk or a magneto optical disk.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for producing print data of a two-dimensional code comprising dark and bright cells representing binary coded data and arranged as a pattern on a two-dimensional matrix, wherein a print data producing means is provided for producing print data for modifying the size of said dark cells in advance so that a boundary between the dark cells and the bright cells is adjustable before performing a printing operation.

2. The print data producing apparatus in accordance with claim 1, further comprising a printing means for printing only dark cells while leaving a non-printed region which is discriminable as said bright cells.

3. The two-dimensional print data producing apparatus in accordance with claim 1, wherein said print data producing means is for producing the print data for expanding the cell size of each dark cell when the boundary between the dark cells and the bright cells is shifted toward the region of said bright cells, and is for producing the print data for expanding the cell size of each bright cell when the boundary between the dark cells and the bright cells is shifted toward the region of said dark cells.

4. The two-dimensional print data producing apparatus in accordance with claim 3, wherein said print data producing means is for expanding said dark or bright cells by increasing a row or line of dots along at least a side of said cells.

5. The two-dimensional print data producing apparatus in accordance with claim 1, further comprising an input means for allowing an operator to enter a size modification degree for designating the size of said dark or bright cells to be modified, wherein said print data producing means is for producing the print data for modifying said dark or bright cells based on said size modification degree entered through said input means.

6. The two-dimensional print data producing apparatus in accordance with claim 5, wherein said input means is for allowing the operator to designate a side or sides of said cells to be modified, and said print data producing means is for producing the print data for modifying said dark or bright cells based on the side of said cells to be modified and the size modification degree which are both designated through said input means.

7. The two-dimensional print data producing apparatus in accordance with claim 1, wherein said print data includes at least one positioning symbol located at a corner of said two-dimensional matrix, and said positioning symbol is used for identifying the position of said two-dimensional code.

8. The two-dimensional print data producing apparatus in accordance with claim 1, wherein the size of said dark cells is modified beforehand so that the dark cells have a regular size when a finally printed two-dimensional code is read by a scanning means.

9. A method for producing print data of a two-dimensional code comprising dark and bright cells representing binary coded data and arranged as a pattern on a two-dimensional matrix, said method comprising the steps of:

developing a matrix pattern of dark and bright cells of regular size on a bit map; and modifying the cell size of specific cells on said bit map, so that a boundary between the dark cells and the bright cells is adjustable before performing a printing operation.

10. The two-dimensional print data producing method in accordance with claim 9, further comprising a step of outputting a dot arrangement image to a printer.

11. The two-dimensional print data producing method in accordance with claim 10, wherein said printer prints only dark cells while leaving a non-printed region which is discriminable as said bright cells.

12. The two-dimensional print data producing method in accordance with claim 9, wherein the print data is produced for expanding the cell size of said specific cells to expand the region of said specific cells and for expanding the cell size of other cells to shrink the region of said specific cells.

13. The two-dimensional print data producing method in accordance with claim 9, wherein said specific cells are expanded by increasing a row or line of dots along at least a side of said cells.

14. The two-dimensional print data producing method in accordance with claim 9, wherein a size modification degree is entered through an input device for designating the size of said specific cells to be modified, and the print data is produced for modifying said specific cells based on the size modification degree entered through said input device.

15. The two-dimensional print data producing method in accordance with claim 14, wherein
   a side or sides of said specific cells to be modified are designated through said input device, and
   the print data is produced for modifying said specific cells based on the side or sides of said specific cells to be modified and the size modification degree which are both designated through said input device.

16. The two-dimensional print data producing method in accordance with claim 9, wherein said print data includes at least one positioning symbol located at a corner of said two-dimensional matrix, and said positioning symbol is used for identifying the position of said two-dimensional code.

17. The two-dimensional print data producing method in accordance with claim 9, wherein the size of said specific cells is modified beforehand so that the specific cells have a regular size when a finally printed two-dimensional code is read by a scanner.

18. A recording medium storing a program for producing print data of a two-dimensional code comprising dark and bright cells representing binary coded data and arranged as a pattern on a two-dimensional matrix,
   characterized in that
   said program is recorded in a format readable by a computer, and
   said print data is for modifying the size of said dark cells in advance so that a boundary between the dark cells and the bright cells is adjustable before performing a printing operation.

* * * * *